3,254,093
PROCESS FOR PREPARING PYRAZOLES
Rolf Huisgen, Hans Gotthardt, and Rudolf Grashey, all of Munich, Germany, assignors to Farbwerke Hoechst Aktiengesellschaft vormals Meister Lucius & Bruning, Frankfurt am Main, Germany, a corporation of Germany
No Drawing. Filed Sept. 18, 1962, Ser. No. 224,544
Claims priority, application Germany, Sept. 22, 1961, F 34,971
3 Claims. (Cl. 260—295)

The present invention relates to a process for preparing pyrazoles from sydnones and alkines.

It is already known (cf. Elderfield, Heterocyclic Compounds, volume 5 (1957), pages 45 et seq.) that pyrazoles are formed by causing hydrazines to act on 1,3-dicarbonyl compounds or on acetylene-ketones and by reacting diazoalkanes with acetylene compounds. According to the first-mentioned method, there are at first formed the hydrazones which are subsequently subjected to cyclization by distilling them or boiling them for a prolonged period with glacial acetic acid or with dilute hydrochloric acid. In many cases bis-hydrazones are predominantly formed which, for the most part, cannot be transformed into pyrazoles. On the other hand, the ring closure reaction can often not be effected with mono-hydrazones either (cf. Berichte der Deutschen Chemischen Gesellschaft, volume 58 (1925), page 2075). Particularly, the reaction of β-keto-aldehydes with hydrazines often takes a complex course and in most cases leads to a mixture of hydrazones and isomeric pyrazoles (cf. Elderfield, Heterocyclic Compounds, volume 5 (1957), pages 51 and 52). As results from the above, the first-mentioned process is not amenable to general use.

When reacting hydrazines with acetylene-ketones, similar difficulties are met. There are formed, for instance, from hydrazine and propargyl-aldehyde as well as phenyl-propargyl-aldehyde in each case two hydrazones that cannot be converted into the pyrazoles. (Journal fur praktische Chemie [2], volume 110 (1925), page 235.) Also with the use of 2,4-dinitrophenyl-hydrazine only the corresponding hydrazones are formed in most cases. (Journal of Chemical Society (1946), page 39.) The third-mentioned method can be carried out in a very restricted scope only, since the diazo-alkanes serving as starting substances are accessible only with difficulty.

Now, we have found that pyrazoles of the formula

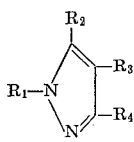

in which $R_1$ represents a low-molecular alkyl radical, a cycloalkyl radical having 5 to 6 carbon atoms or a phenyl radical which may be substituted by alkyl or alkoxy groups of low molecular weight, by nitro groups or halogen atoms, a phenyl-alkyl radical of low molecular weight, a pyridyl radical, a thienyl, furfuryl or naphthyl radical, $R_2$ represents hydrogen, an alkyl radical of low molecular weight, a phenyl-alkyl radical of low molecular weight, a phenyl or a pyridyl radical, $R_3$ and $R_4$ each are hydrogen, an alkyl group having from 1 to 8 carbon atoms, a hydroxy-alkyl-radical of low molecular weight, a carbalkoxy radical of low molecular weight, a phenyl-alkyl radical of low molecular weight, a phenyl radical, an acyl group, an acetalized acyl group, an aldehyde group or an acetalized aldehyde group can be prepared by causing sydnones of the general formula

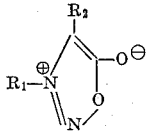

wherein $R_1$ and $R_2$ have the meanings given above, to react at an elevated temperature with alkines of the formula $$R_3-C\equiv C-R_4$$

in which $R_3$ and $R_4$ have the meanings given above.

The reaction which is an object of the invention proceeds according to the following scheme:

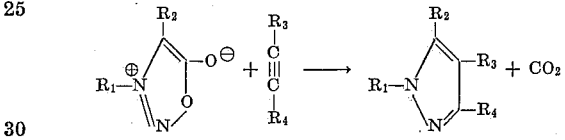

As starting substances for the process according to the invention there may be used N-alkyl-sydnones, N-phenyl-alkyl-sydnones, N-phenyl-sydnones substituted in the phenyl radical by alkyl, alkoxy, halogen or the nitro group or unsubstituted N-phenyl-sydnones and those carrying at the nitrogen atom a pyridyl, thienyl, furfuryl or naphthyl radical as well as those moreover substituted at the carbon atom by an alkyl, phenyl, or pyridyl radical. There may be mentioned for example:

N-methyl-sydnone,
N-ethyl-sydnone,
N-propyl-sydnone,
N-butyl-sydnone,
N-pentyl-sydnone,
N-cyclopentyl-sydnone,
N-cyclohexyl-sydnone,
N-benzyl-sydnone,
N-phenylethyl-sydnone,
N-phenyl-sydnone,
N-tolyl-sydnone,
N-anisyl-sydnone,
N-pyridyl-sydnone,
N-thienyl-sydnone,
N-furfuryl-sydnone,
N-phenyl-C-methyl-sydnone,
N-methyl-C-phenyl-sydnone,
N-benzyl-C-phenyl-sydnone,
N-phenyl-C-phenyl-sydnone,
N-pyridyl-C-methyl-sydnone,
N-methyl-C-ethyl-sydnone,
N-benzyl-C-pyridyl-sydnone,
N-chlorophenyl-sydnone,
N-nitrophenyl-sydnone,
N-naphthyl-sydnone.

The sydnones can be prepared, for instance, according to the method described in Journal Chemical Society (1935), page 899 by cyclisation of N-nitroso-alkylamino-carboxylic acid or N-nitroso-arylamino-carboxylic acids with acetic acid anhydride.

As reactants there are used according to the invention acetylene, monoalkylacetylenes and dialkyl-acetylenes, monophenylalkyl- and diphenylalkyl-acetylenes, mono- and diphenyl - acetylenes, alkyl-phenylalkyl-acetylenes, alkyl - phenyl - acetylenes, phenylalkyl-phenyl-acetylenes, mono- and dicarboxylic acid esters of the acetylene series, acetylene-ketones and acetylene-aldehydes as well as the corresponding acetals and acetaylene-carbinols. Some characteristic representatives are mentioned as examples in the following: acetylene, 1-propine, 1-butine, 1-hexine, 1-octine, benzyl-acetylene, phenyl-acetylene, 2-butine, 2-hexine, 3-hexine, 4-octine, 2-octine, dibenzyl-acetylene, diphenyl - acetylene, methyl - benzylacetylene, methyl-phenyl-acetylene, esters of propiolic acid, esters of acetylene-dicarboxylic acid and esters of phenyl-propiolic acid, for instance their methyl and ethyl esters, 1-phenyl-2-acetyl-acetylene, 1-phenyl-2-benzoyl-acetylene, propargyl-aldehyde, propargyl-aldehyde-acetals, for instance those derived from lower aliphatic alcohols such as methanol, ethanol, propanol and butanol or 1,2-diols or 1,3-diols such as ethylene-glycol, propane-diol-(1,2) and propane-diol-(1,3), and propargyl-alcohol.

For carrying out the method of the invention the reactants are suitably caused to react on each other in an inert solvent at an elevated temperature, until the evolution of carbon dioxide is terminated. The use of a solvent can be dispensed with if an alkine is used in excess which is liquid at the reaction temperature. The period and the temperature of the reaction naturally depend on the reactivity and the thermal stability of the reactants, but can in most cases be varied within wide limits. The reaction periods, for example, are between about 1 hour and several days, and the reaction temperatures between about 50 and 220° C., preferably between 80 and 180° C., often at the boiling point of the solvent used.

In addition to the above-mentioned liquid alkines there may be used as solvents aromatic hydrocarbons such as benzene, particularly toluene and xylene, aliphatic hydrocarbons such as petroleum ether of a high boiling point, chlorinated hydrocarbons, for instance, chlorobenzene, dichlorobenzene and tetrachlorethylene, ethers such as dioxane, tetrahydrofurane, anisol and di-n-butyl ether, dimethyl-formamide, ketones such as di-n-butylketone and acetophenone as well as glycol-monoalkyl ether and glycol-dialkyl ether.

If desired, the process of the invention can likewise be carried out under pressure. This is of special importance for the use of acetylene and other alkines volatile at the reaction temperature. Under these circumstances there can naturally be used in addition to the above-mentioned reactants solvents of a lower boiling point. Acetone is mentioned as being most suitable in this connection.

The reaction mixture is suitably worked up by distilling off the solvent or the excessive alkine, if desired under reduced pressure, and purifying the residue by distillation or recrystallization. If solvents miscible with water are used, for instance acetone or dimethyl-formamide, the reaction mixture can likewise be introduced into water and the separating product is filtered off or extracted with an appropriate solvent. If necessary, the filter residue or the residue obtained upon removing the solvent by evaporation is further purified in the manner described above.

It should be mentioned, that monosubstituted acetylenes form addition products in two directions, but in most cases one direction is considerably favored. The mixtures that may be obtained can be separated according to known methods, for instance by fractional crystallization.

In comparison to the above-mentioned prior methods the process according to the invention is distinguished by the facts that it can generally be used, it does not cause side reactions and it gives good, in many cases practically quantitative, yields.

An advantageous embodiment of the process according to the invention consists in that the preparation of the sydnone serving as starting substance is combined with the reaction with the alkine. In this manner one reaction stage can be omitted, since the isolation of the sydnone can be dispensed with. This favorable method of operation is suitably carried out by reacting for instance a N-nitroso-alkylamino-carboxylic acid or a N-nitroso- or a N-nitroso-arylamino-carboxylic acid in an excessive amount of acetic acid anhydride with an excessive amount of an alkine. As regards the reaction temperatures, they are the same as mentioned above, the reaction is however, preferably carried out at the boiling point of the acetic acid anhydride. The products are worked up and purified in the manner described above for the process of the invention.

The products obtained by the process of the present invention are intermediate products for the production of medicaments, insecticides and other chemicals; a part of them may directly be used as pharmaceutical substances.

The following examples serve to illustrate the invention but they are not intended to limit it thereto:

*Example 1.—1-phenyl-pyrazole*

1.62 grams of N-phenyl-sydnone are heated in the bomb tube for 25 hours at 170–180° C. with 3 to 4 grams of acetylene in 10 cc. of acetone. The reaction product is distilled under reduced pressure at 115–125° C. (bath temperature). The 1-phenyl-pyrazole is obtained as a yellowish oil in a yield of 75% of the theoretical yield. The infra-red spectrum is identical with that of a preparation prepared in an independent way.

*Example 2.—1-phenyl-5-methyl-3-n-hexyl-pyrazole*

A solution of 1.76 grams of N-phenyl-C-methyl-sydnone and 2.2 grams of 1-octine in 20 cc. of dry xylene is boiled under reflux for 30 hours. Upon concentration under reduced pressure there are obtained by distillation in the high vacuum in the form of a yellowish oil 1.88 grams (78% of the theory) of the addition product passing over under a pressure of 0.001 mm. of mercury at 125° C. (bath temperature).

$C_{16}H_{22}N_2$ (242.4) calculated: C 79.29%, H 9.15%, N 11.56%. Found: C 78.64%, H 9.00%, N 11.51%.

*Example 3.—1-benzyl-3-n-hexyl-pyrazole*

The solution of 1.76 grams of N-benzyl-sydnone and 2.2 grams of 1-octine in 20 cc. of dry xylene is boiled for 4 days under reflux. It is concentrated under reduced pressure and the addition product is obtained in a yield of 1.10 g. (45% of the theory) as a light-yellow oil by distillation in the high vacuum at 120–130° C. (bath temperature) under a pressure of 0.001 mm. of mercury.

$C_{16}H_{22}N_2$ (242.4) calculated: C 79.29%, H 9.15%. Found: C 79.31%, H 9.42%.

*Example 4.—1,3-diphenyl-pyrazole*

1.62 grams of N-phenyl-sydnone are heated with 10.0 cc. of phenyl-acetylene for 64 hours to 100° C. The mass is concentrated under reduced pressure, the brownish residue is recrystallized from a mixture of ether and petroleum ether. 1.24 grams (56% of the theoretical yield) of colorless crystals are obtained which show a melting point of 85.5 to 86° C. The identity with a product prepared in an independent way is proved by the mixed melting point.

$C_{15}H_{12}N_2$ (220.3) calculated: N 12.72%. Found: N 12.61%.

Example 5.—1,3-diphenyl-5-methyl-pyrazole 1.76 grams of N-phenyl-C-methyl-sydnone are boiled for 11.5 hours under reflux with 2.13 grams of phenyl-acetylene in 20 cc. of xylene, whereby nearly the theoretically assumed amount of carbon dioxide escapes. After drawing off of the solvent under reduced pressure, there are obtained by distillation in the high vacuum at 155° C. (bath temperature) under a pressure of 0.001 mm. of mercury 1.85 grams (79% of the theory) of a light-yellow oil which solidifies to form crystals of a melting point of 71 to 120° C. On dissolving the substance and recrystallizing it from methanol about 15% of the isomeric 1,4-diphenyl-5-methyl-pyrazole are removed. The melting point of the 1,3-diphenyl compound amounts to 76 to 77.5° C.

$C_{16}H_{14}N_2$ (234.3) calculated: N 11.78%. Found: N 12.08%.

Example 6.—1-benzyl-3-phenyl-pyrazole

The solution of 1.76 grams of N-benzyl-sydnone and 3.56 grams of phenyl-acetylene in 20 cc. of xylene is boiled for 20 hours under reflux. After concentration under reduced pressure the residue is taken up in a mixture of chloroform and petroleum ether (boiling point 40 to 60° C.) and thus separated from N-benzyl-sydnone that has not reacted (0.32 gram). Distillation in the high vacuum delivers at 160–170° C. (bath temperature) under a pressure of 0.001 mm. of mercury 1.42 grams of a light-yellow oil which solidifies in the cold to form crystals. After dissolution and recrystallization of the substance from methanol the compound melts at 63.5 to 65° C. The yield amounts to 69% calculated on N-benzyl-sydnone that has reacted.

$C_{16}H_{14}N_2$ (234.3) calculated: C 82.02%, H 6.02%, N 11.78%. Found: C 82.30%, H 6.14%, N 11.85%.

Example 7.—1,3,4-triphenyl-pyrazole 1.62 grams of N-phenyl-sydnone are heated for 138 hours to 95° C. with 5.30 grams of tolane in 5 cc. of toluene. The substance is worked up by distillation in the high vacuum. After the tolane has drawn off there is obtained at a temperature of 200–220° C. (bath temperature) under a pressure of 0.001 mm. of mercury an oil which solidifies to form crystals of a melting point of 92–94° C. By dissolving and recrystallizing the substance from petroleum ether (boiling point 40 to 60° C.) the melting point amounts to 96–97° C. The yield in addition product amounts to 31% of the theory.

$C_{21}H_{16}N_2$ (296.4) calculated: C 85.10%, H 5.44%, N 9.45%. Found: C 85.06%, H 5.50%, N 9.53%.

Example 8.—1,3,4-triphenyl-5-methyl-pyrazole 1.76 grams of N-phenyl-C-methyl-sydnone and 7.12 grams of tolane are heated for 5 hours to 180° C. whereby the theoretically calculated amount of carbon dioxide escapes. Excessive tolane is removed by distillation in the high vacuum at 160° C. under a pressure of 0.001 mm. of mercury, the residue is digested with methanol. There are obtained 2.99 grams (97% of the theoretical yield) of colorless needles showing a melting point of 144–146° C. Upon dissolution and recrystallization from a mixture of acetone and methanol (1:1) the melting point of the 1,3,4-triphenyl-5-methyl-pyrazole amounts to 147–148° C.

$C_{22}H_{18}N_2$ (310.4) calculated: C 85.13%, H 5.85%, N 9.03%. Found: C 85.28%, H 5.78%, N 9.18%.

Example 9.—1,3-diphenyl-4-methyl-pyrazole and 1,4-diphenyl-3-methyl-pyrazole The solution of 1.62 grams of N-phenyl-sydnone and 3.48 grams of 1-phenyl-2-methyl-acetylene in 10 cc. of xylene is boiled for 20 hours under reflux. Upon concentration under reduced pressure there pass over at a temperature of 150–170° C. (bath temperature) under a pressure of 0.01 mm. of mercury 1.95 grams (74% of the theoretical yield) of the mixture of isomers in the form of a light-yellow oil which solidifies in the cold to form crystals of a raw melting point of 45–48° C. The separation is successfully carried out by fractional crystallization.

$C_{16}H_{14}N_2$ (234.3) calculated: C 82.02%, H 6.02%, N 11.96%. Found: C 82.09%, H 6.04%, N 12.10%.

Example 10.—1-phenyl-pyrazole-carboxylic acid-(3)-methyl ester; -1-phenyl-pyrazole-carboxylic acid-(4)-methyl ester 1.62 grams of N-phenyl-sydnone are heated with 1.68 grams of propiolic acid methyl ester in 20 cc. of xylene for 48 hours to 100° C. by distillation in the high vacuum at 130–140° C. under a pressure of 0.02 mm. of mercury there are obtained after previous elimination of the solvent 1.91 grams (95% of the theoretical yield) of a brownish crystallization product showing a melting point of 61.5 to 66.5° C. The net yield in addition product of propiolic acid methyl ester amounts to 92% of the theoretical yield. The 1-phenyl-pyrazole-carboxylic acid-(4)-methyl ester showing a melting point of 130 to 131° C. and the 1-phenyl-pyrazole-carboxylic acid-(3)-methyl ester showing a melting point of 76–77° C. can be separated by fractional crystallization. The quantitative infra-red analysis shows that the two isomers are formed in a ratio of 24:76.

Example 11.—1-phenyl-5-methyl-pyrazole-carboxylic acid-(3)methyl ester; 1-phenyl-5-methyl-pyrazole-carboxylic acid-(4)-methyl ester The solution of 1.76 grams of N-phenyl-C-methyl-sydnone and 1.68 grams of propiolic acid methyl ester in 20 cc. of xylene is boiled for 4 hours under reflux. By distillation in the high vacuum there are obtained at 150° C. under a pressure of 0.001 mm. of mercury 1.53 grams (71% of the theoretical yield) of a light-yellow oil which when recrystallized from a mixture of ether and petroleum ether (1:1) delivers colorless crystals which melt at 34–48° C. By fractional crystallization from a mixture of ether/petroleum ether there are obtained the colorless plates of the 1-phenyl-5-methyl-pyrazole-carboxylic acid-(3)-methyl ester melting at 54–55° C. as the hardly soluble portion.

$C_{12}H_{12}N_2O_2$ (216.2) calculated: C 66.65%, H 5.59%, N 12.96%. Found: C 66.62%, H 5.74%, N 12.93%.

From the mother lye the 1-phenyl-5-methyl-pyrazole-carboxylic acid-(4)-methyl ester of a melting point of 70 to 70.6° C. can be obtained and identified with a preparation obtained on an independent way. The quantitative infra-red analysis shows that 61% of the first and 10% of the second isomer were formed.

Example 12.—1-benzyl-pyrazole-carboxylic acid-(3)-methyl ester 1.76 grams of N-benzyl-sydnone and 1.68 grams of propiolic acid methyl ester are heated in 20 cc. of xylene for 3.5 hours to 110° S. and subsequently for 5 hours to 130–140° C. (bath temperature). After concentration of the substance under reduced pressure the residue solidifies. By recrystallization from a mixture of benzene and petroleum ether (1:2) 1.47 grams (68% of the theoretical yield) of colorless needles are obtained which melt at 83–84° C.

$C_{12}H_{12}N_2O_2$ (216.2) calculated: C 66.65%, H 5.59%, N 12.96%. Found: C 66.85%, H 5.74%, N 12.9%.

Example 13.—1-phenyl-pyrazole-dicarboxylic acid-(3,4)-dimethyl ester

At 90° C., the solution of 1.2 grams of N-phenyl-sydnone and 2.0 cc. of acetylene dicarboxylic acid-dimethyl ester in 10 cc. of toluene delivers in the course of 4 hours the theoretically calculated amount of carbon dioxide. The mass is concentrated under reduced pressure, the residue is dissolved and recrystallized from methylene chloride/petroleum ether and 2.40 grams (92% of the theoretical yield) of yellow tinged crystals are obtained which melt at 97 to 99° C. Upon dissolution and recrystallization from methanol the melting point amounts to 99 to 100° C.

$C_{13}H_{12}N_2O_4$ (260.3) calculated: C 59.98%, H 4.64%, N 10.77%. Found: C 60.18%, H 4.70%, N 10.94%.

*Example 14.—1-phenyl-5-methyl-pyrazole-dicarboxylic acid-(3,4)-dimethyl ester*

1.76 grams of N-phenyl-C-methyl-sydnone, 2.84 grams of acetylene-dicarboxylic acid-dimethyl ester and 20 cc. of xylene are heated for 1 hour to 120° C. By distillation in the high vacuum there are obtained at 180° C. (bath temperature) under a pressure of 0.001 mm. of mercury 2.74 grams (99% of the theoretical yield) of a light-yellow oil completely solidifying in the cold; raw melting point 54–57° C. Upon dissolution and recrystallization from methanol the melting point amounts to 57 to 59.4° C.

$C_{14}H_{14}N_2O_4$ (274.3) calculated: C 61.31%, H 5.15%, N 10.21%. Found: C 61.83%, H 5.20%, N 10.43%.

The constitution is proved by hydrolysis and decarboxylation into the 1-phenyl-5-methyl-pyrazole and by comparison of the infra-red spectrum with that of an authentical preparation.

*Example 15.—1-benzyl-pyrazole-dicarboxylic acid-(3,4)-dimethyl ester*

1.76 grams of N-benzyl-sydnone and 2.84 grams of acetylene-dicarboxylic acid-dimethyl ester are heated in 20 cc. of xylene for 5 hours to 120° C. The substance is worked up by distillation in the high vacuum. At 185° C. and under a pressure of 0.001 mm. of mercury 2.68 grams (98% of the theoretical yield) of a light-yellow oil are obtained, which after heating with dilute sodium hydroxide solution and acidification by means of dilute hydrochloric acid is hydrolized into the free dicarboxylic acid (melting point 196–197° C.).

$C_{12}H_{10}N_2O_4$ (246.2) calculated: C 58.53%, H 4.09%, N 11.38%. Found: C 58.19%, H 4.25%, N 11.51%.

*Example 16.—1,3-diphenyl-pyrazole-carboxylic acid-(4)-ethyl ester*

By heating 1.62 grams of N-phenyl-sydnone and 3.0 cc. of phenyl-propiolic acid ethyl ester for 84 hours to 95° C. in 10 cc. of toluene a red solution is obtained. Alcohol is added to the concentrated solution, whereupon 2.30 grams of crystals separate. After dissolution and recrystallization from ethanol the colorless needles melt at 93–94° C. Yield 83%.

$C_{18}H_{16}N_2$ (292.3) calculated: C 73.95%, H 5.51%, N 9.58%. Found: C 73.84%, H 5.27%, N 9.68%.

By alkaline hydrolysis there is obtained the 1,3-diphenyl-pyrazole-carboxylic acid-(4) which is identical with a preparation produced by another method.

*Example 17.—1,3-diphenyl-5-methyl-pyrazole- carboxylic acid-(4)-ethyl ester*

By heating 1.76 grams of N-phenyl-C-methyl-sydnone with 3.48 grams of phenyl-propiolic acid ethyl ester in 20 cc. of xylene to 110° C. there are set free within 7.5 hours 9.4 millimols of carbon dioxide. By distillation at 180° C. (bath temperature) under a pressure of 0.001 mm. of mercury 2.52 grams (82% of the theoretical yield) of a viscous oil are obtained; this oil, when triturated with a small amount of methanol crystallizes completely. The colorless cubes melt at 104–105° C. and are identical to a product obtained independently.

$C_{19}H_{18}N_2O_2$ (306.4) calculated: C 74.49%, H 5.92%, N 9.15%. Found: C 74.84%, H 6.04%, N 9.26%.

*Example 18.—1,3-diphenyl-4-acetyl-pyrazole*

1.62 grams of N-phenyl-sydnone are boiled with 2.88 grams of 1-phenyl-2-acetyl-acetylene in 10 cc. of chlorobenzene for 12 hours under reflux. The substance is worked up by distillation in the high vacuum. At 175–200° C. (bath temperature) and under a pressure of 0.001 mm. of mercury 2.60 grams (100% of the theory) of an oil pass over which solidifies in the form of crystals and shows a melting point of 95 to 99° C. By dissolution and recrystallization from methanol coarse pikes are obtained that melt at 102.5 to 104° C.

$C_{17}H_{14}N_2O$ (262.3) calculated: N 10.68%. Found: 10.96%.

The structure is proved by oxidation to 1,3-diphenyl-pyrazole-4-carboxylic acid and comparison of the infra-red spectrum with that of an authentical preparation.

*Example 19.—1,3-diphenyl-4-benzoyl-pyrazole*

The solution of 1.62 grams of N-phenyl-sydnone and 2.22 grams of 1-phenyl-2-benzoyl-acetylene in 10 cc. of xylene is boiled for 16 hours under reflux. After concentration under reduced pressure the brownish residue solidifies completely. By recrystallization from methanol there are obtained 2.67 grams (82% of the theory) of colorless needles which melt at 140–141° C.

$C_{22}H_{16}N_2O$ (324.4) calculated: N 8.64%. Found: N 8.41%.

*Example 20.—1-phenyl-5-methyl-pyrazole-3-aldehyde-di-n-propyl-acetal*

The solution of 1.76 grams of N-phenyl-C-methyl-sydnone and 2.12 grams of propional-di-n-propyl-acetal in 20 cc. of xylene is boiled for 15 hours in the reflux cooler. At 140 to 180° C. (bath temperature) and under a pressure of 0.001 mm. of mercury 1.88 grams (77% of the theory) pass over in the form of a yellow oil, the semicarbazone of which melts at 187.7 to 188.2° C. Analysis of the 1-phenyl-5-methyl-pyrazole-3-aldehyde-semicarbazone:

$C_{12}H_{13}N_5O$ (243.3) calculated: C 59.25%, H 5.39%, N 28.79%. Found: C 59.07%, H 5.41%, N 28.47%.

*Example 21.—1-phenyl-3-hydroxymethyl-pyrazole*

1.62 grams of N-phenyl-sydnone are boiled with 10.0 cc. of propargyl-alcohol for 24 hours under reflux. By distillation in the high vacuum (135° C./0.001 mm. of mercury) 1.71 grams of a light-yellow oil are obtained which after recrystallization from a mixture of ether and petroleum ether (1:1) delivers 1.14 grams (72% of the theory) of shining leaflets which melt at 44 to 48° C. Upon dissolution and recrystallization from a mixture of methylene chloride and petroleum ether (1:1) the substance melts at 52.5 to 54° C.

$C_{10}H_{10}N_2O$ (174.2) calculated: C 68.95%, H 5.79%, N 16.08%. Found: C 69.31%, H 5.75%, N 16.02%.

The permanganate oxidation in aqueous pyridine of 50% strength results into 1-phenyl-pyrazole-carboxylic acid-(3) which corresponds to an authentical preparation.

*Example 22.—1-(p-tolyl)-3-phenyl-pyrazole-carboxylic acid-(4)-ethyl ester*

10.0 millimols of N-p-tolyl-sydnone, 4.0 cc. of phenyl-propiolic acid ethyl ester are heated in 10 cc. of xylene for 3 hours at the reflux cooler. By distillation in the high vacuum at 210–220° C. (bath temperature) and under a pressure of 0.01 mm. of mercury there is obtained a light-yellow viscous oil which upon recrystallization from methanol delivers 2.99 grams (98% of the theory) of colorless prisms which melt at 88.5 to 90.5° C. By dissolution and recrystallization from methanol the melting point amounts to 92–93° C.

$C_{19}H_{18}N_2O_3$ (306.4) calculated: C 74.49%, H 5.92%, N 9.15%. Found: C 74.19%, H 5.97%, N 8.89%.

Example 23.—1-(p-chlorophenyl)-3-phenyl-pyrazole-carboxylic acid-(4)-ethyl ester 10.0 millimols of N-(p-chlorophenyl)-sydnone, 4.0 cc. of phenyl-propiolic acid ethyl ester and 10 cc. of xylene are boiled for 3 hours under reflux. After concentration of the brownish reaction solution the residue crystallizes in the cold. After recrystallization from methanol there are obtained 3.01 grams (92% of the theoretical yield) of the pyrazole substance in the form of colorless needles which melt at 121.5 to 122.5° C.

$C_{18}H_{16}ClN_2O_2$ (327.8) calculated: N 8.55%. Found: N 8.76%.

Example 24.—1-(p-methoxyphenyl)-3-phenyl-pyrazole-carboxylic acid-(4)-ethyl ester 10 millimols of N-(p-methoxyphenyl)-sydnone, 3.0 cc. of phenyl-propiolic acid ethyl ester and 10 cc. of xylene are boiled for 2 hours under reflux. After concentration of the reaction solution under a pressure of 11 mm. of mercury, the residue crystallizes in the cold. After dissolution and recrystallization from methanol 2.67 grams (83% of the theory) of colorless needles are isolated which melt at 95–96° C.

$C_{19}H_{18}N_2O_3$ (322.4) calculated: C 70.79%, H 5.63%, N 8.69%. Found: C 70.57%, H 5.58%, N 9.20%.

Example 25.—1,3,5-triphenyl-pyrazole-carboxylic acid-(4)-ethyl ester 10.0 millimols of N,C-diphenyl-sydnone, 4.0 cc. of phenyl-propiolic acid-ethyl ester in 10.0 cc. of p-cymol are heated for 6 hours to 160° C. (bath temperature). After concentration of the reaction solution the residue which is crystalline in the cold is dissolved and recrystallized from a mixture of acetone and methanol. 3.21 grams (87% of the theory) of colorless crystals are obtained which melt at 146–147° C.

$C_{24}H_{20}N_2O_2$ (368.4) calculated: C 78.24%, H 5.47%, N 7.59%. Found: C 78.23%, H 5.40%, N 7.78%.

Example 26.—1,3,4,5-tetraphenyl-pyrazole 10.0 millimols of N,C-diphenyl-sydnone are heated with 3.0 grams of tolane for 9 hours to 190° C. (bath temperature). After having drawn off the excessive tolane in the high vacuum, the residue is dissolved in a mixture of acetone and methanol and 3.65 grams (98% of the theory) of the colorless 1,3,4,5-tetraphenyl-pyrazole are obtained which melt at 216–218° C.

A comparison preparation produced on an independent way is identical as regards mixed melting point and infra-red spectrum.

Example 27.—1,3-diphenyl-4,5-dimethyl-pyrazole; 1,4-diphenyl-3,5-dimethyl-pyrazole 10.0 millimols of N-phenyl-C-methyl-sydnone are boiled with 30.0 millimols of 1-phenyl-2-methyl-acetylene in 10.0 cc. of xylene for 50 hours under reflux. By distillation in the high vacuum at a temperature of 145–180° C. (bath temperature) and under a pressure of 0.01 mm. of mercury 1.92 grams (82% of the theory) of the mixture of isomers is obtained as a light-yellow viscous oil.

$C_{17}H_{16}N_2$ (248.3) calculated: N 11.38%. Found: N 11.47%.

Example 28.—1-(3-pyridyl)-3-phenyl-pyrazole; 1-(3-pyridyl)-4-phenyl-pyrazole 10.0 millimols of N-(3-pyridyl)-sydnone and 3.0 cc. of phenyl-acetylene in 10 cc. of xylene are boiled under reflux for 3 hours. The mixture of isomers obtained by distillation in the high vacuum in a yield of 91% can be separated from methanol of 80% strength by fractional crystallization.

$C_{14}H_{11}N_3$ (221.3) calculated: C 76.00%, H 5.01%. Found: C 76.70%, H 5.11%.

Example 29.—1-benzyl-3-phenyl-pyrazole-carboxylic acid -(4)-ethyl ester 10.0 millimols of N-benzyl-sydnone and 20.0 millimols of phenyl-propiolic acid ethyl ester in 20 cc. of xylene are boiled for 16 hours under reflux. The substance is worked up by distillation in the high vacuum. At 200–205° C. (bath temperature) and under a pressure of 0.001 mm. of mercury 2.15 grams of a light-yellow oil are obtained which when recrystallized from methanol deliver 1.41 grams (46% of the theoretical yield) of colorless crystals which melt at 69–70.8° C.

$C_{19}H_{18}N_2O_2$ (306.4) calculated: C 74.49%, H 5.92%, N 9.15%. Found: C 74.68%, H 5.89%, N 9.20%.

Example 30.—1-phenyl-pyrazole-dicarboxylic acid-(3,4)-dimethyl ester 10.0 millimols of N-nitroso-N-phenyl-glycine are boiled with 3.0 cc. of acetylene-dicarboxylic acid dimethyl ester (21 millimols) and 20 cc. of acetanhydride for 30 minutes under reflux; within 3 minutes 200 cc. of carbon dioxide already escape. After having removed the excessive acetanhydride and the acetylene-dicarboxylic ester by distillation, the crystalline residue is dissolved and recrystallized from methanol. 1.93 grams of colorless coarse needless (74% of the theoretical yield) are obtained which melt at 99–100° C. The mixed melting point and the infra-red spectrum prove the identity with the preparation produced from crystallized N-phenyl-sydnone and acetylene-dicarboxylic acid dimethyl ester.

We claim:

1. A process of preparing pyrazole of the Formula I

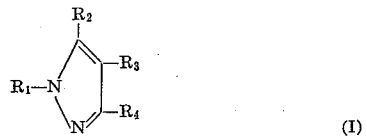

(I)

wherein $R_1$ is a member selected from the group consisting of lower alkyl, cycloalkyl having from 5 to 6 carbon atoms, phenyl, phenyl substituted by a member selected from the group consisting of lower alkyl, lower alkoxy, halogen and the nitro-group, lower phenylalkyl, pyridyl, thienyl, furfuryl and naphthyl, $R_2$ is a member selected from the group consisting of hydrogen, lower alkyl, phenyl and pyridyl, $R_3$ and $R_4$ each are members selected from the group consisting of hydrogen, alkyl having at most 8 carbon atoms, lower hydroxyalkyl, lower carbalkoxy, lower phenylalkyl, phenyl, lower alkanoyl, benzoyl, the aldehyde group and the aldehyde group acetalized by a member selected from the group consisting of a lower alkanol, ethylene-glycol, propane-diol-(1.2), propane-diol-(1.3) and propargyl-alcohol, which comprises reacting in the heat a sydnone of the Formula II

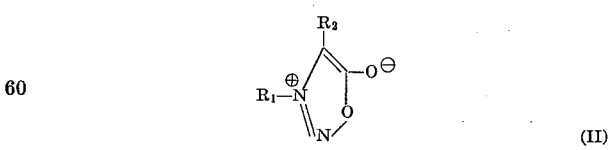

(II)

wherein $R_1$ and $R_2$ have the meanings given above, with alkines of the Formula III

$$R_3-C\equiv C-R_4 \qquad (III)$$

2. The method defined in claim 1 wherein the reaction is carried out at a temperature between about 50 and 220° C.

3. The method defined in claim 1 wherein the reaction is carried out at a temperature between about 80 and 180° C.

(References on following page)

References Cited by the Examiner

Earl et al., Jour. Chem. Soc. (London), 1935, pages 899–900.

Fugger et al., Jour. Amer. Chem. Soc., vol. 77, pages 1843–48 (1955).

Hackh's Chemical Dictionary, 3rd ed., page 18, Philadelphia, Blackiston, 1944.

Huisgen et al., Angewandte Chemie, vol. 74, pages 29–30 (Jan. 7, 1962).

Morton, The Chemistry of Heterocyclic Compounds, p. VI of the preface, New York, McGraw-Hill, 1946.

Vasileva et al., Zhurnal Obshchei Khimii, vol. 31, pp. 1501–4 (1961). (Abstract in Chemical Abstracts, vol. 55, p. 22291b (1961).)

Vasileva et al., Zhurnal Obshchei Khimii, vol. 32, 1446–51 (May 1962).

WALTER A. MODANCE, *Primary Examiner.*

NICHOLAS RIZZO, *Examiner.*

N. TROUSOF, *Assistant Examiner.*